United States Patent [19]

Eskinazi et al.

[11] 4,407,738

[45] Oct. 4, 1983

[54] PROCESS FOR PREPARING A PLATINUM/RHODIUM CATALYST

[75] Inventors: Victoria Eskinazi, Boothwyn; John F. Kirner, Media, both of Pa.; Charles R. Wilson, Swedesboro, N.J.

[73] Assignee: Air Products and Chemicals, Inc., Allentown, Pa.

[21] Appl. No.: 333,131

[22] Filed: Dec. 21, 1981

[51] Int. Cl.³ .................... B01J 21/04; B01J 23/42; B01J 23/44; B01J 23/46

[52] U.S. Cl. .................................. 502/334; 502/332

[58] Field of Search .............................. 252/466 PT

[56] References Cited

U.S. PATENT DOCUMENTS 4,119,571 10/1978 Hegedus et al. ............. 252/466 PT
4,120,821 10/1978 Iizuka et al. ...................... 252/432
4,128,506 12/1978 Hegedus et al. .............. 252/466 PT
4,152,301 5/1979 Summers et al. ............. 252/466 PT
4,153,579 5/1979 Summers et al. .................. 252/462

FOREIGN PATENT DOCUMENTS 2727137 12/1977 Fed. Rep. of Germany ... 252/466 PT

*Primary Examiner*—W. J. Shine
*Attorney, Agent, or Firm*—Richard A. Dannells, Jr.; E. Eugene Innis; James C. Simmons

[57] ABSTRACT

The process for preparing a regionalized platinum/rhodium catalyst using a single impregnating step. The process is particularly effective in preparing such a catalyst for use as an automotive emissions control catalyst. A substantially alumina support is impregnated in a platinum/rhodium controlled acidic solution of a strong acid and an ammonium salt or equivalent thereof.

14 Claims, 9 Drawing Figures

PROCESS FOR PREPARING A PLATINUM/RHODIUM CATALYST

TECHNICAL FIELD

This invention relates to an improved process for preparing platinum/rhodium catalysts with the precious metals regionalized so that the majority of the platinum is distributed nearest to the external pellet surface and the majority of the rhodium is distributed further in toward the center of the surface. A preferred embodiment of this invention is directed to preparing three-way layered automotive emission control catalysts used in a system in which the air-to-fuel (A/F) ratio fed to the engine is controlled at the stoichiometric point. More particularly, the process of the present invention provides an improvement in the sequential impregnation steps used to produce an emission control catalyst in which the platinum is at its maximum concentration at or near the external surface of the catalyst support and the rhodium plus other metals such as palladium have a preponderance of their total weight in a second region adjacent to the first but at a finite distance from the surface of the support.

Concern over the polluting effects of not only unburned hydrocarbons and carbon monoxide but $NO_x$ being emitted from internal combustion engines has led to the development of three-way automotive emissions control catalysts which perform the multiple functions of oxidation of unburned hydrocarbons and carbon monoxide and the reduction of the oxides of nitrogen. Although numerous catalysts have been proposed and are well known for carrying out these reactions, the prior art catalyst which has been found to be the most effective is the three-way layered catalyst disclosed and claimed in Summers et al., U.S. Pat. Nos. 4,152,301 and 4,153,579 and Hegedus et al., U.S. Pat. No. 4,128,506.

The prior art method for making such three-way catalysts comprises first impregnating a substantially alumina support with a compound of a platinum metal such as chloroplatinic acid, platinum chloride, bromoplatinic acid and the like to form a first layer on the support and then in a second step impregnating the platinum containing support with a solution of at least one of the compounds of rhodium and palladium to form a second layer or region within the body of the support.

The substantially alumina support in the present process are any of the active or transition form aluminas, e.g. gamma-, delta-, eta-, theta-, iota, chi- and kappa-alumina including mixtures thereof. Alpha-aluminas, for example, are not included in this list as they have been found to become rapidly deactivated upon continuous exposure to automotive exhaust.

Hegedus et al., U.S. Pat. No. 4,119,571 discloses a typical oxidative automotive emissions control catalyst in which Pt/Pd are deposited on a gamma alumina support by spraying the support with a catalyst solution of chloroplatinic acid and palladium chloride or other mixtures of soluble salts so that the metals reach the desired depth of penetration. There is nothing in this reference which suggests to one skilled in the art how to achieve the desired characteristics noted above in connection with the prior art methods for preparing a three-way catalyst via a single impregnation.

Lizuka et al., U.S. Pat. No. 4,120,821 discloses the preparation of platinum/rhodium on alumina catalysts for conversion of engine exhaust gas in whichh the pH of the single impregnation is controlled at pH values of less than 2 by means of a strong acid such as hydrochloric acid. There is no suggestion in this reference to preparation of a layered catalyst or to the effect control of pH of the impregnation solution has on controlling the penetration of the metals into the alumina substrate.

BRIEF SUMMARY OF THE INVENTION

In contrast to the prior art methods for making a platinum/rhodium catalyst, the present process comprises impregnating a substantially alumina support in a single step using a controlled acidic solution of a platinum-containing compound, a rhodium-containing compound, a strong acid and an ammonium salt which includes other equivalent salts whose cation contains an amine such as quaternary ammonium and pyridinium salts and the like.

The strong acid is preferably selected from the group consisting of hydrochloric, nitric, sulfuric, phosphoric, hydrobromic and mixtures thereof. The preferred ammonium salt is selected from the group consisting of ammonium chloride, ammonium acetate and ammonium nitrate and mixtures thereof. The amounts of the strong acid and ammonium salt additives are adjusted so that the total controlled acidic solution is at least about 0.01 Normal (N), preferably in the range of about 0.02 to 0.5 N.

The platinum-containing compound can be any which is either selected from the group consisting of chloroplatinic acid, bromoplatinic acid and mixtures thereof or other compounds which can be converted to such platinum-containing compounds in the presence of one of the foregoing acid and salt additives.

The rhodium-containing compound is selected from the group consisting of rhodium trichloride, ammonium hexachlororhodate and mixtures thereof or other compounds which can be converted to such rhodium-containing compounds in the presence of one of the foregoing acid and salt additives.

It has been found that the present process is completely different from the prior art methods of depositing platinum group metals. The process of the present invention enables one to prepare layered or regionalized platinum/rhodium catalysts by a single impregnation in which the major concentration of platinum is deposited in a region at or adjacent the surface of the catalyst support and the preponderance of the total weight of rhodium or rhodium and other noble metals, e.g. palladium, are deposited in a second region adjacent the first region, but penetrating within the surface of the support in order to obtain optimum catalytic activity and aging characteristics.

Although not being bound by the following theoretical explanation for the surprising results achieved by employing the single impregnation step of the present invention in comparison to multiple impregnation steps of the prior art to achieve a superior three-way catalyst, the following is believed to be a reasonable rationale of why the present process achieves such results. When the substrate initially contacts the impregnation solution, the pH of the acidic solution is controlled so that it is in the range of about 0 to 3 and preferably in the range of about 1.5 and 2.5. Under these acidic conditions, such platinum group species as $PtCl_6^=$, or $PdCl_4^=$ or $Pd_2Cl_6^=$ become adsorbed onto the support. The effect of the concentration of the additives of HCl, $HNO_3$, $H_2SO_4$, $H_3PO_4$ and/or HBr in combination with an additive of $NH_4Cl$, $NH_4OAc$ (where $OAc=O_2C_2H_3$) and $NH_4NO_3$, is not clearly understood. It is believed that if the levels of the anionic additives such as the chlorides, nitrates, sulfates, phosphates and/or bromides are too high, the platinum can be forced into the support because it is in competition with the anion of the salt for adsorption sites. Platinum and probably palladium are then adsorbed initially on those available sites near the surface of the support. At the initial low pH of the solution within the range noted above, rhodium does not become adsorbed onto the surface of the support since it is believed to exist as a neutral or cationic species. However, as the time elapses during the single impregnation step which is carried out within a period of between about 2 minutes to 30 minutes, the pH of the impregnation solution increases slowly and sometimes abruptly as the acidic solution becomes neutralized primarily due to the presence of the alumina substrate. At some point in time as the pH changes during the impregnation step, the rhodium species becomes anionic, e.g. $RhCl_3 (H_2O)_3 + OH^- \rightleftharpoons RhCl_3 (H_2O)_2 (OH)^- + H_2O$. Rhodium in its anionic form then can be adsorbed from the impregnation solution which will still have a pH below the isoelectric point of the substrate. At a pH greater than the isoelectric point cationic exchange occurs; at a pH lower than this point anionic exchange occurs. (see J. P. Brunelle "Preparation of Catalysts II", page 211, Proceedings of the Second International Symposium, Louvain-la-Neuve, Sept. 4-7 1978, B. Delmon, P. Grange, P. Jacobs, G. Poncelet editors, Elsevier Scientific Publishing Company, Amsterdam, Oxford and New York 1979). However, because platinum and/or other anions have occupied all of the sites at or near the surface of the support and hence they are unavailable for rhodium, rhodium becomes adsorbed on the nearest available sites which at this point in time become those at a finite distance within the support and below and away from the first layer of platinum. It is believed that the role of the cation, such as the ammonium ion of the salt of the listed additives, is to buffer the impregnation solution so that the pH remains below the isoelectric point of the substrate. In addition, it maintains the pH high enough so that the rhodium exists as an anionic species, but not so high as to precipitate the rhodium before adsorption can occur.

Previously, it was believed that the only method to achieve the selective adsorption achieved by the present process was by sequential impregnation steps as discussed above in connection with the discussion of the prior art. The resulting three-way catalyst prepared in accordance with the present method has been found to have as good a protection against poisoning and detrimental alloy formation as the prior art three-way catalysts.

The remaining conditions of the single impregnation step of this process are temperatures in the range of about 0° to about 100° C., preferably the impregnation is conducted about 10° to about 35° C. and still more preferably at room temperature for a period of about 2 minutes to 30 minutes, preferably about 5 minutes to 15 minutes. The amounts in units of normality of the strong acid (i.e. proton) and the ammonium salt additives making up the impregnation solution for the preparation of about 430 grams of a substantially alumina substrate, for example, 1 liter of pelleted substrate, range from about 0.001 N to 0.5 N for the acid and from about 0.01 N to 0.5 N for the salt, preferably from 0.02 N to 0.4 N for the acid and from 0.02 N to 0.25 N for the salt.

After the support has been impregnated in the manner set forth above, the resulting catalyst is dried at temperatures ranging from about 80° to 250° C., preferably about 105° to 150° C. for about five minutes to 4 hours resulting in a preferred moisture content of about 1% by weight water. The catalyst is then calcined to reduce the metal salts to metal, preferably using hydrogen as a reducing agent by operating at temperatures in the range of about 300° to 650° C., preferably 450° to 500° C. for a period of about 10 minutes to 12 hours, preferably 30 minutes to 4 hours.

BRIEF DESCRIPTION OF THE DRAWINGS

The foregoing description of the invention will be more clearly understood when read in connection with the attached drawings in which.

DESCRIPTION OF PREFERRED EMBODIMENTS

Figure 1:
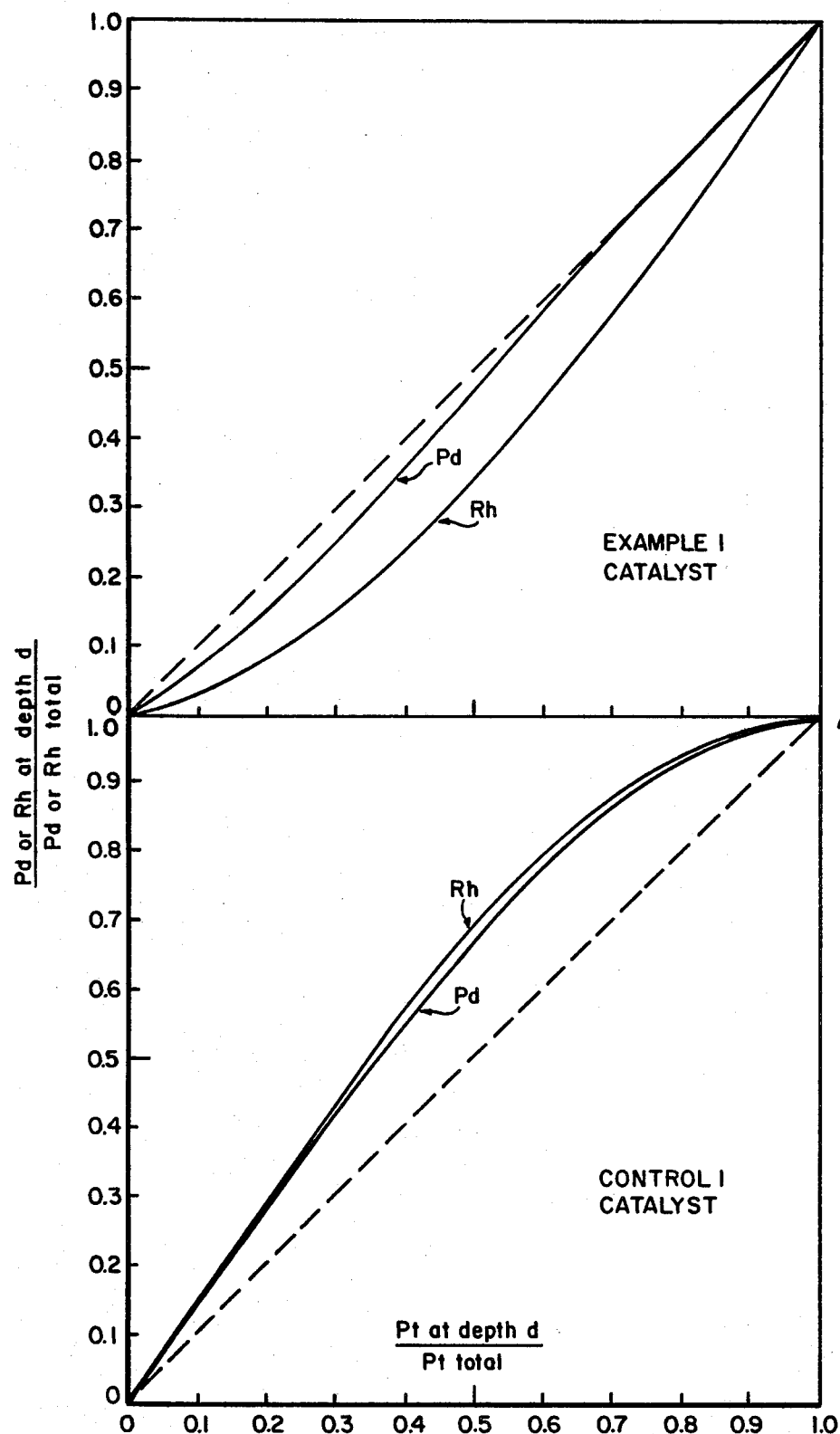
FIGS. 1-4 show plots of the relative distribution of palladium and rhodium on the support versus platinum for catalysts of Examples 1-5 and Controls 1-2.
Figure 2:
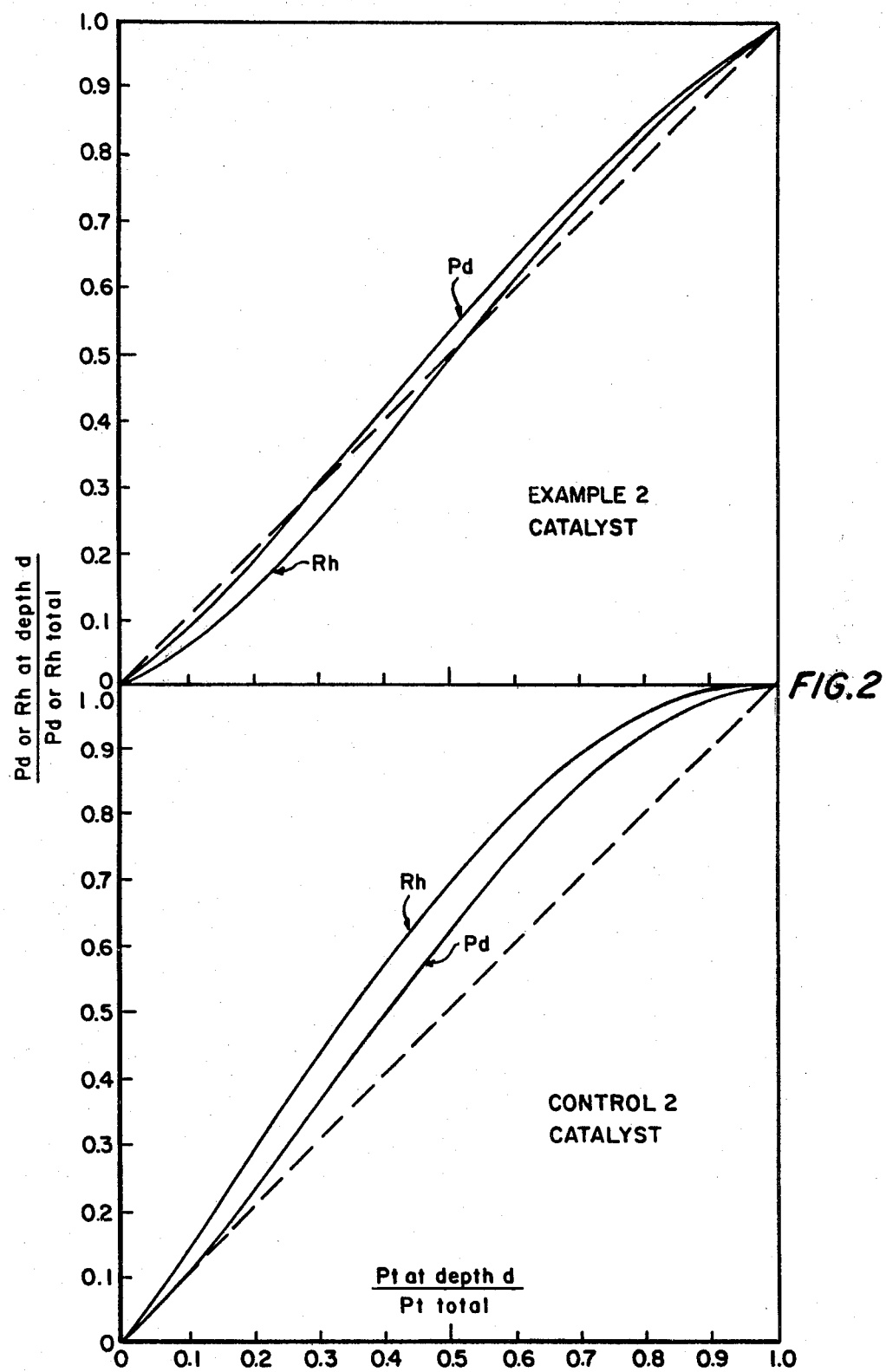

The process of the present invention is further clarified by reference to a plurality of examples:

EXAMPLES 1-5

An impregnating solution was prepared containing 2.19 cc of 1.389 molar chloroplatinic acid, 59.5 cc of 0.0376 molar palladium chloride (with the moles of Cl:Pd equivalent to 4:1), 14.8 cc of 0.0389 molar rhodium trichloride and an amount of 1 molar acid additive and 1 molar salt additive as set forth in the table below. The resulting solution was used to spray impregnate 1 liter samples of gamma-alumina support. The substrate also contained nominally 1.2 wt. % $La_2O_3$, 0.8 wt. % $Nd_2O_3$ and 1 wt. % $CeO_2$. The alumina support was in the form of 0.318 cm (⅛ inch) diameter spheres having a packed density of either 426 kg/liter or 429 kg/liter and a high water absorptivity by weight of either 117.7% or 108.6% as indicated below. The support had previously been calcined in dry air at a temperature of 593° C. (1100° F.) for 2 hours. The impregnation with the above impregnating solution took place at room temperature in a rotary impregnator for a total time of 8 minutes with additional tumbling in the impregnator for 5 minutes. The impregnated substrate was then dried in air at 120° C. for 2 hours and after heating to about 500° C. (930° F.) in 100% $N_2$, it was reduced for 2 hours with 5% $H_2$/95% $N_2$ at 500° C.

The results obtained on catalyst samples of Examples 1-5 are discussed below in which it was found that they all met the criteria of having the desired radial distribution of the platinum group metals and had improved aging characteristics when applied to the treatment of automotive exhausts.

Controls 1 and 2

The procedure of Examples 1-5 were repeated except that neither the strong acid nor the ammonium salt were added in the case of Control 1 or the salt was omitted in the case of Control 2. As will be discussed below in connection with a detailed description of the FIGS., 7–9, the catalyst of the controls did not meet the criteria of having the desired metal distribution or aging characteristics of the catalysts of the present invention.

other hand, amounts substantially greater than 50% of the total Rh in the Example 1 catalyst had been forced to penetrate into the second region of the catalyst, i.e. the interior making up the internal 90% of the radius of the catalyst. This second region contained substantially

TABLE

| | Sub-strate | ACID | | | SALT | | | TOTAL SOLUTION | |
|---|---|---|---|---|---|---|---|---|---|
| | | Identity | Vol. of 1M Soln. | Normality | Identity | Vol. of 1M Soln. | Normality | Vol., ml | Initial pH |
| Example No. | | | | | | | | | |
| 1 | A | HCl | 132 ml | 0.33 | $NH_4Cl$ | 44 ml | 0.11 | 400 | 1.41 |
| 2 | B | HCl | 53 ml | 0.12 | $NH_4Cl$ | 53 ml | 0.12 | 443 | * |
| 3 | B | HCl | 18 ml | 0.04 | $NH_4Cl$ | 18 ml | 0.04 | 443 | * |
| 4 | B | HCl | 27 ml | 0.06 | $NH_4OAc$ | 9 ml | 0.02 | 443 | * |
| 5 | B | $HNO_3$ | 18 ml | 0.04 | $NH_4NO_3$ | 18 ml | 0.04 | 443 | * |
| Control No. | | | | | | | | | |
| 1 | A | — | — | — | — | — | — | 400 | 2.17 |
| 2 | B | HCl | 10 ml | 0.022 | — | — | — | 443 | * |

Substrates:
A = 426g, Density = 426 kg/liter, 117.7% $H_2O$ Abs.
B = 429g, Density = 429 kg/liter, 108.6% $H_2O$ Abs.
*not available FIGS. 1 to 4 show the relative distributions of the metals in the catalyst of Examples 1–5 and Controls 1 and 2 by plotting the normalized amounts of the palladium and rhodium up to a given depth versus the normalized amount of the platinum adsorbed for a given depth in the pellets, e.g. Pd at depth "d" divided by Pd total versus Pt at depth "d" divided by Pt total. If the resulting curve lies above the line of unit slope, the metal has been deposited within the support shallower than platinum; and if it lies below, the metal is forced deeper into the support than platinum. Example 1 is the preferred mode for operating the process of the present invention in which both palladium and rhodium in the catalyst were substantially below the line which represents unity indicating that palladium and rhodium were forced further into the pellet than platinum. For the catalysts of Controls 1 and 2, which were not prepared in accordance with the present invention, the opposite result was obtained in which palladium and rhodium were deposited closer to the surface of the support than was platinum. For the remaining catalysts of the examples, palladium was deposited closer to the surface than platinum and the rhodium/platinum ratio exhibited a cross-over from less than unity to greater than unity as a function of pellet diameter. This shows that near the surface of the pellets, platinum was deposited in a region of lower rhodium concentration and most of the rhodium was forced into the pellet as was the case in the best mode of Example 1. However, the band of platinum was not as narrow in the remaining examples as it was in the optimum case and exhibited a broad band extending further into the interior of the support.

Figure 3:
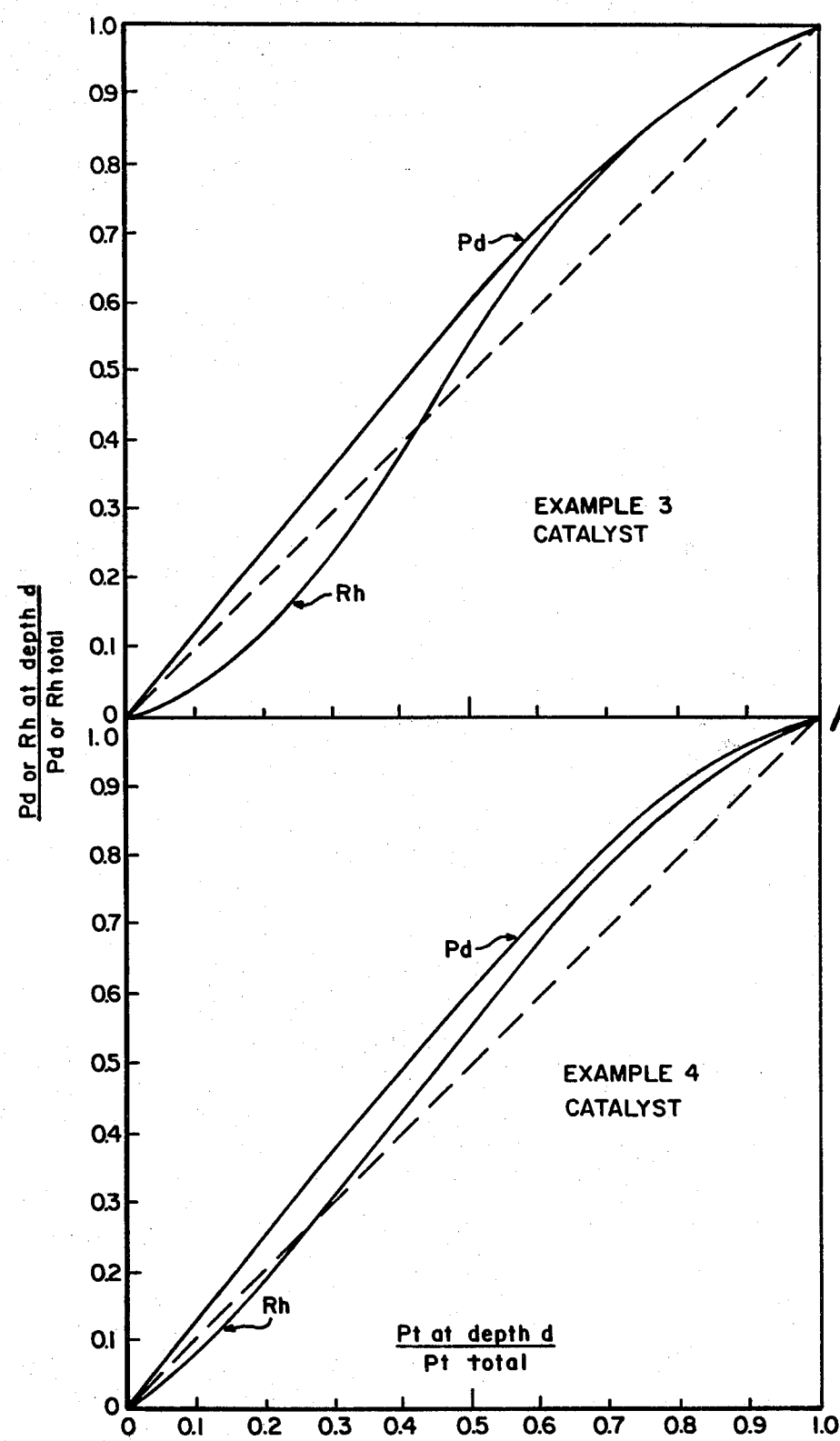
Figure 4:
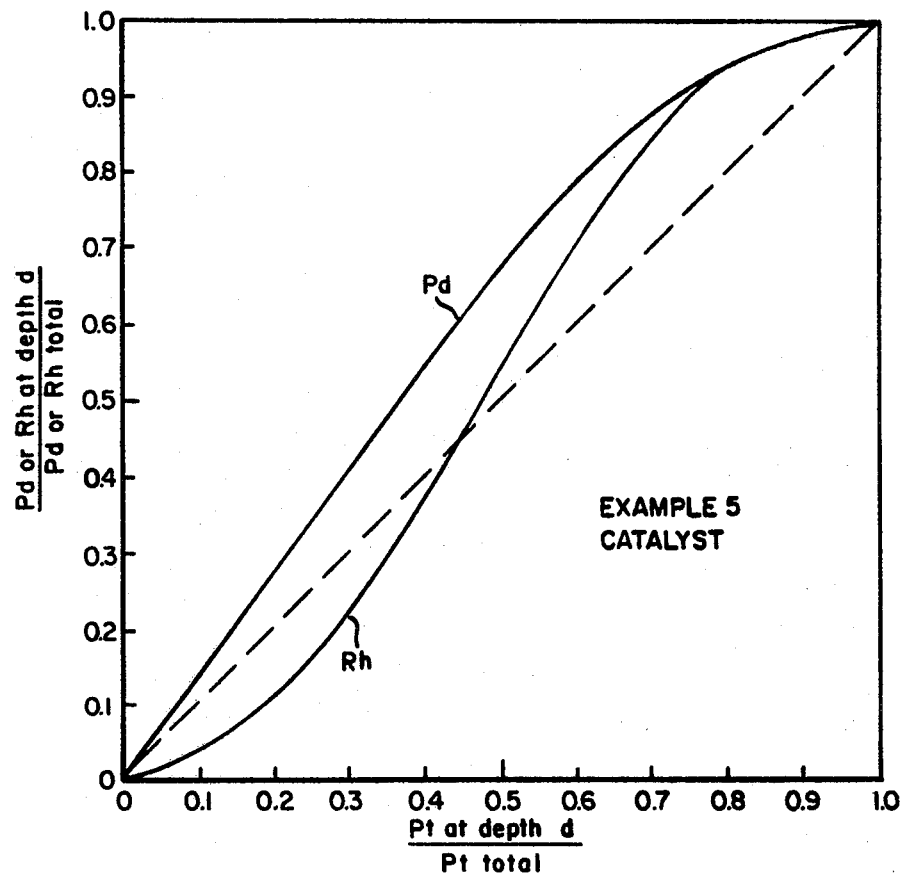

The similarity between the catalysts of Examples 3 and 5 shown on FIGS. 3 and 4 demonstrates the equivalence of the $HCl/NH_4Cl$ and $HNO_3/NH_4NO_3$ additive systems.

Figure 5:
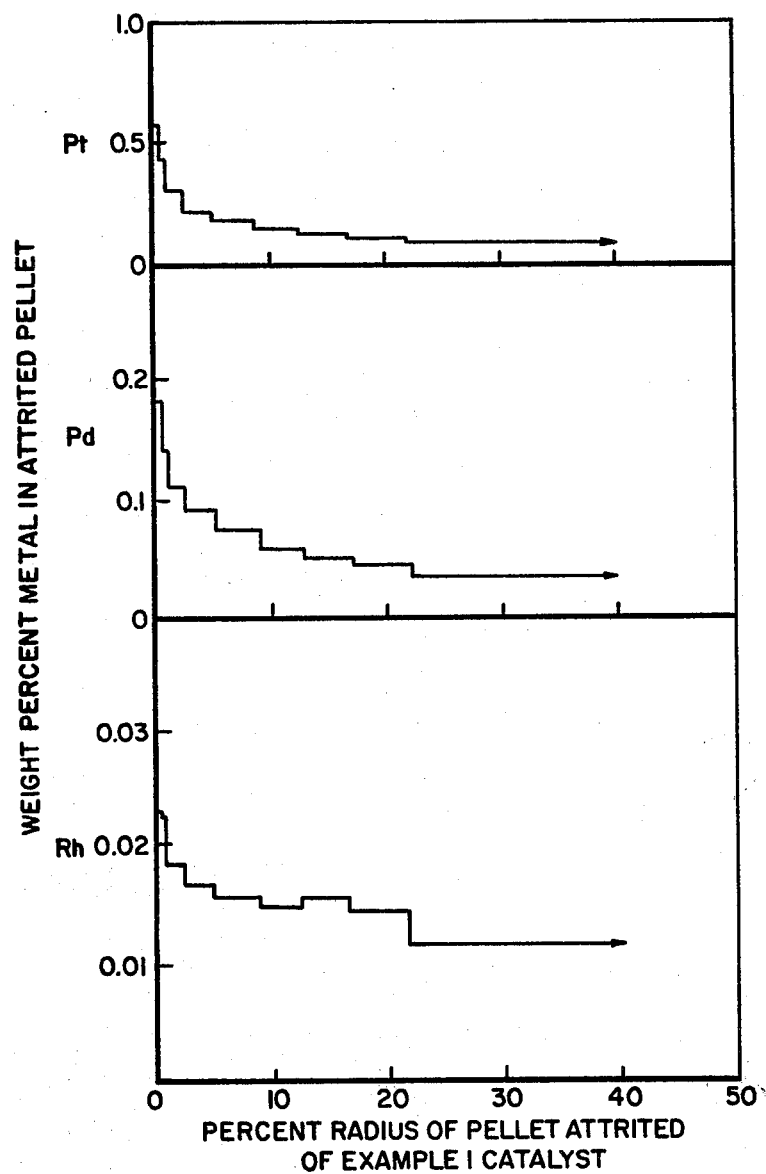
FIGS. 5-6 show the Pt, Pd and Rh distribution on the catalyst support for the catalysts of Example 1 and Control 1, respectively.
Figure 6:
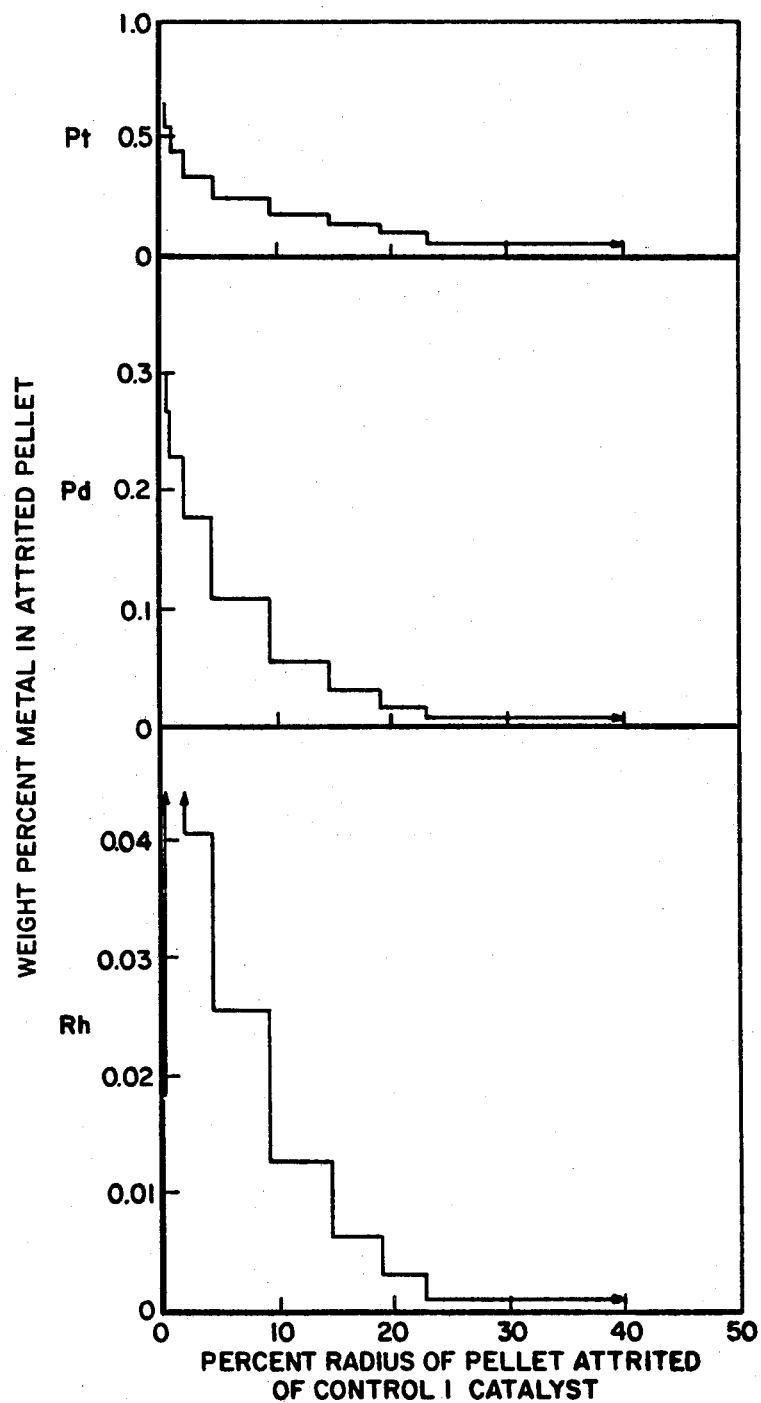

The radial distributions of the metals for the catalysts of Example 1 and Control 1 are shown in FIGS. 5–6, as determined by using standard x-ray fluorescence analysis of the attrited samples with suitable background corrections. FIG. 5 demonstrates that in the Example 1 catalyst, amounts substantially greater than 50% of the total Pt were found in the first region making up less than 10% of the outermost radius of the catalyst. On the less than 50% of the total Pt in the Example 1 catalyst. Pd exhibited a behaviour which was intermediate to that of Rh and Pt. FIG. 6 demonstrates that in the Control 1 catalyst, amounts substantially greater than 50% of the total Pt, Rh and Pd were found in the first region of the catalyst. Eventually, the concentration of metals in all cases falls off to zero before the center of the catalyst is reached, i.e. when the percent radius of the catalyst pellet attrited approaches 100%.

Figure 7:
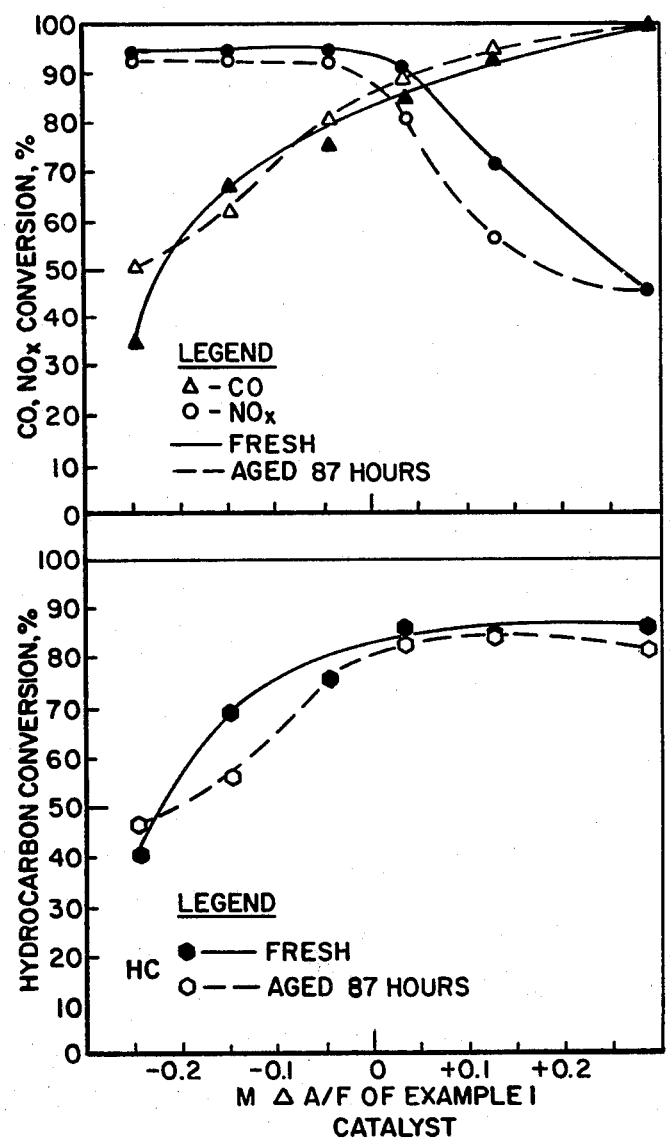
FIGS. 7-9 show the performance curves for the catalysts of Example 1 and Control 1, respectively in the conversion of HC, CO, and $NO_x$ at different mean $\Delta A/F$ ratios under fresh and aged conditions.
Figure 8:
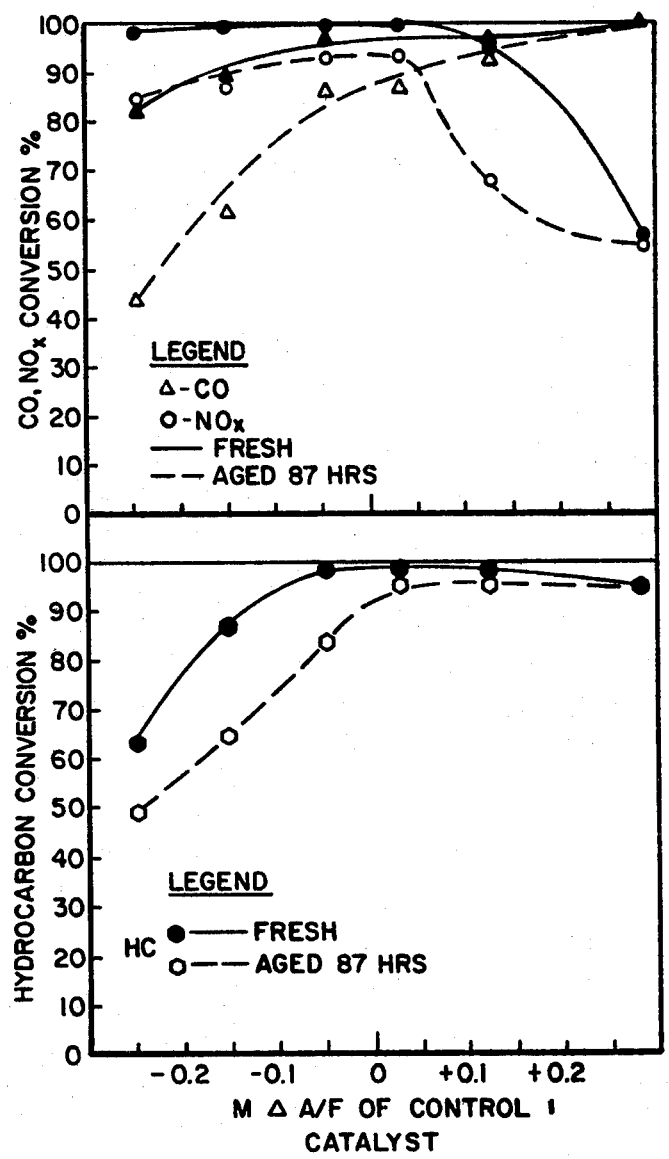
Figure 9:
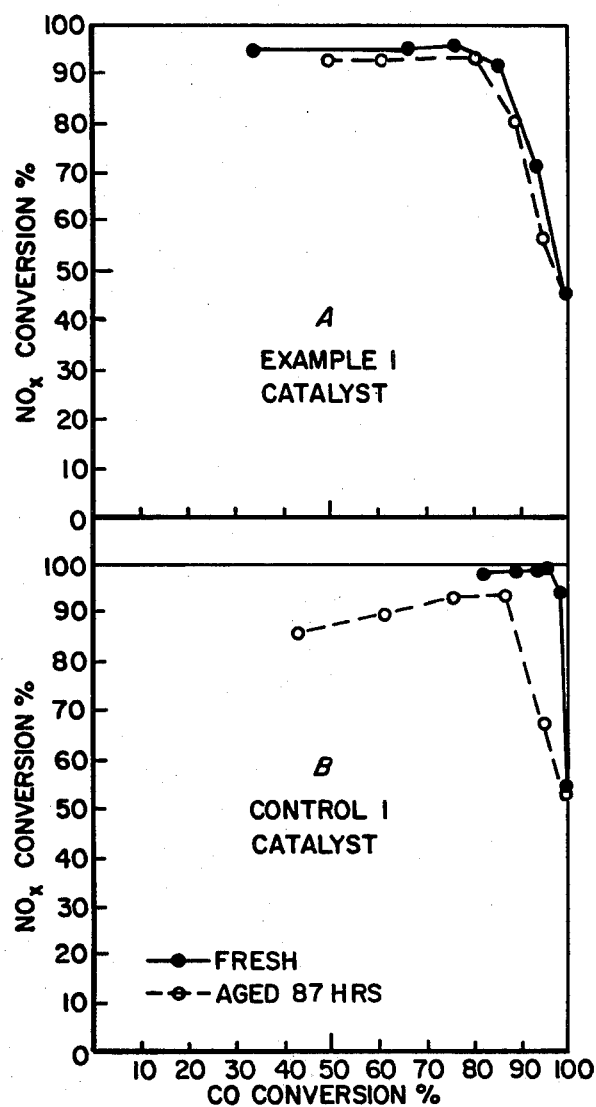

Plots of the three-way activity test data for CO, $NO_x$ and HC conversion for the two catalysts are set forth in the FIGS. 7–9. FIGS. 7 and 8 demonstrate the activities for fresh and aged Example 1 and Control 1 catalysts at several mean $\Delta A/F$ ratios, i.e. the mean difference from the stoichiometric A/F ratio represented on the curve as zero, for CO, $NO_x$ and HC conversions.

FIG. 9 represents a cross-plot of the activity data from FIGS. 7 and 8 for CO and $NO_x$. For example, at a mean $\Delta A/F$ of $-0.25$, the aged $NO_x$ conversion was 92% and the aged CO conversion was 50% for the Example 1 catalyst data plotted in FIG. 7. These two data points were plotted on FIG. 9A as 1 point.

The specific testing procedures for the three-way catalysts of Examples 1–5 and Controls 1–2 are as follows:

Propane was burned with air in a large boiler to generate the principal portion of hot gases for passage over the catalyst at the appropriate temperatures. Amounts of other gases were then mixed in to achieve a mixture representative of an actual automobile engine exhaust gas. Typically, gasoline has a stoichiometric A/F ratio (wt. basis) of 14.55 for complete combustion of all feed to $CO_2$ and $H_2O$. To more closely approximate actual variations in engine gas, the oxygen concentration was swept between two extremes to yield an average value for a given test. The test was run with several different mixtures of gases to yield different values of A/F and plotted on the ordinate as $\Delta A/F$. Thus, in a given test at a $\Delta A/F$ of $+0.1$ meant that a mixture of gases corresponding to an average A/F equal to 14.65 was conducted over the catalyst and tested for net conversions of CO, hydrocarbon and oxides of nitrogen. The same series of tests were then run after the catalyst sample had been aged at a specific number of hours on the actual engine exhaust gas controlled at stoichiometric ratio.

Deterioration of the three-way catalyst performance was observed by the collapse of the high conversion values on the left hand side of FIG. 9 in the CO versus $NO_x$ plot upon aging in that region corresponding to operation of the engine in a fuel rich mode. It can be seen that catalyst of Example 1 was superior in its performance relative to Control 1 catalyst because its activity remained relatively constant during aging while the activity of the Control 1 catalyst was higher initially but decreased substantially upon aging for 87 hours. This illustrates that by practicing the process of the present invention under ideal conditions one obtains a more stable, longer life catalyst. Further optimization of the Example 1 catalyst, it is believed, would result in an overlapping curve of the type shown in FIG. 9A but shifted toward the 100% conversion as was the case of the fresh catalyst of Control 1.

In practice, for different formulations entailing different concentrations of precious metals than those set forth in the preceding examples, the optimum concentrations of added acid and salt will have to be determined by performing rate studies at the new initial concentrations of metals. These studies will show that the rate of adsorption of platinum is greater than rhodium and that one must maintain the half lives for total adsorption of all metals at less than 20 minutes and at preferably less than 8 minutes. It will also be necessary to repeat the experiments similar to those of the foregoing examples, if the nature of the stabilization of the principly alumina substrate is changes. Likewise, minor variations are expected if the substrate exits as a washcoat on a monolithic structure instead of as a pelleted carrier.

Although palladium chloride was the only palladium-containing compound used in the impregnating solution to impart the Pd component into the catalyst, it is obvious that other palladium-containing compounds can be used such as palladium nitrate and similar compounds which are converted to palladium chloride or palladium nitrate in the presence of the aforementioned acid and salt additives.

What is claimed is:

1. In a method of preparing a platinum/rhodium catalyst having a substantially alumina catalyst support on which there is positioned a first region of platinum having its maximum concentration near the surface of said support and a second region positioned adjacent to said first region and penetrating into said support having a preponderance of the total rhodium metal and a minor amount of the total platinum metal, the improvement which comprises impregnating said support in a single step using a controlled acidic solution of a platinum-containing compound, a rhodium-containing compound, and a strong acid and an ammonium salt or equivalents thereof in amounts to yield at least about 0.01 N solution.

2. The method of claim 1 wherein said catalyst is an automotive emissions control catalyst.

3. The method of claim 1 wherein said strong acid is selected from the group consisting of hydrochloric, nitric, sulfuric, phosphoric, hydrobromic acids and mixtures thereof.

4. The method of claim 1 or 3 wherein said ammonium salt is selected from the group consisting of ammonium chloride, ammonium acetate, ammonium nitrate and equivalents thereof.

5. The method of claim 1 wherein said platinum-containing compound is selected from the group consisting of chloroplatinic acid, bromoplatinic acid and mixtures thereof and comounds which are converted into said platinum-containing compounds in the presence of said acid and said salt.

6. The method of claim 1 or 5 wherein said rhodium-containing compound is selected from the group consisting of rhodium trichloride, ammonium hexachlororhodate and mixtures thereof and compounds which are converted into said rhodium-containing compounds in the presence of said acid and said salt.

7. The method of claim 1 wherein said impregnation takes place at a temperature in the range of about 0° to 100° C. for a period of about 2 minutes to 30 minutes.

8. The method of claim 1 wherein the resulting impregnated catalyst is dried for a period of 5 minutes to 4 hours at a temperature in the range of 80° to 250° C. and calcined at a temperature in the range of about 300° to 650° C. for a period of 10 minutes to 12 hours.

9. The method of claim 1 wherein the amounts of the acid and the salt in the impregnation solution ranges from about 0.001 N to 0.5 N for the acid and from about 0.01 N to 0.5 N for the salt.

10. The method of claim 9 wherein the amounts range from 0.02 N to 0.4 N for the acid and from 0.02 N to 0.25 N for the salt.

11. The method of claim 1 wherein a palladium-containing compound is included in the impregnating solution.

12. In a method of preparing a platinum/rhodium automotive emissions control catalyst having a substantially alumina catalyst support on which there is positioned a first region making up less than 10% of the outermost radius of said catalyst of platinum having its maximum concentration near the surface of said support and a second region positioned adjacent to said first region and penetrating into said support having a preponderance of the total rhodium metal and a minor amount of the total platinum metal, the improvement which comprises the steps of impregnating said support in a single step at temperature in the range of about 10° C. to about 35° C. for a period of about 5 minutes to 15 minutes using a controlled acidic solution of a platinum-containing compound selected from the group consisting of chloroplatinic acid, bromoplatinic acid and mixtures thereof and compounds which are converted into said platinum-containing compounds in the presence of said acid and said salt, selected from the group consisting of hydrochloric, nitric, sulfuric, phosphoric, hydrobromic acids and mixtures thereof, and an ammonium salt selected from the group consisting of ammonium chloride, ammonium acetate, ammonium nitrate and equivalents thereof, in amounts to yield a solution in the range of about 0.02 to 0.5 N, drying the resulting impregnated catalyst for a period of about 5 minutes to 4 hours at a temperature in the range of about 105° to 150° C.; calcining the dried catalyst with a reducing agent for a period of about 30 minutes to 4 hours at a temperature in the range of about 450° to 500° C.; and recovering said catalyst in which substantially greater than 50% of the total platinum in said catalyst is in said first region and substantially greater than 50% of the total rhodium metal and substantially less than 50% of the total platinum metal of said catalyst is in said second region.

13. The method of claim 12 wherein said reducing agent is hydrogen.

14. The method of claim 12 wherein a palladium-containing compound is included in the impregnating solution.

* * * * *